(12) United States Patent
Nitzan et al.

(10) Patent No.: US 7,884,720 B2
(45) Date of Patent: Feb. 8, 2011

(54) INTERMEDIATE ATTACHMENT MECHANISM AND USE THEREOF IN RFID TRANSPONDER

(75) Inventors: Zvi Nitzan, Zofit (IL); Yoram Karmon, Petach Tikva (IL)

(73) Assignee: PowerID Ltd., Petach-Tikva (IL)

( * ) Notice: Subject to any disclaimer, the term of this patent is extended or adjusted under 35 U.S.C. 154(b) by 321 days.

(21) Appl. No.: 11/997,434

(22) PCT Filed: Jul. 31, 2006

(86) PCT No.: PCT/IL2006/000886

§ 371 (c)(1),
(2), (4) Date: Jan. 31, 2008

(87) PCT Pub. No.: WO2007/015237

PCT Pub. Date: Feb. 8, 2007

(65) Prior Publication Data

US 2008/0218345 A1 Sep. 11, 2008

(51) Int. Cl.
*G08B 13/14* (2006.01)

(52) U.S. Cl. .............. 340/572.1; 340/572.8; 340/572.9; 340/10.1; 235/385

(58) Field of Classification Search ............. 340/572.1, 340/572.8, 572.9, 10.1; 235/385
See application file for complete search history.

(56) References Cited

U.S. PATENT DOCUMENTS

| | | | |
|---|---|---|---|
| 5,652,043 A | 7/1997 | Nitzan | |
| 5,811,204 A | 9/1998 | Nitzan | |
| 5,897,522 A | 4/1999 | Nitzan | |
| 2003/0165744 A1 | 9/2003 | Schubert et al. | |
| 2005/0168340 A1* | 8/2005 | Mosher et al. | ........... 340/572.8 |
| 2007/0024425 A1 | 2/2007 | Nitzan et al. | |

FOREIGN PATENT DOCUMENTS

| | | |
|---|---|---|
| FR | 2775810 | 9/1999 |
| FR | 2822572 | 9/2002 |
| FR | 2831331 | 4/2003 |
| WO | WO 98/49653 | 11/1998 |
| WO | WO 01/69524 | 9/2001 |
| WO | WO 2007/015237 | 2/2007 |

OTHER PUBLICATIONS

Communication Pursuant to Article 94(3) EPC Dated Oct. 21, 2008 From the European Patent Office Re.: Application No. 06766201.5.

(Continued)

*Primary Examiner*—George A Bugg
*Assistant Examiner*—Ojiako Nwugo

(57) ABSTRACT

The present invention provides an intermediate attachment mechanism, called a powerposer (10), which includes at least one power source (16) coupled to an integrated circuit (14), at least one integrated circuit, which is arranged to store a code comprising information and powered with energy provided by the power source and a substrate (12) on which the at least one power source and the at least one integrated circuit are disposed, and wherein the substrate comprises connection means (22) for connecting to an application device and attachment means for attaching to the application device. Further, the present invention provides a battery assisted or active RFID transponder featuring a transponder substrate, at least one antenna disposed on the transponder substrate and a powerposer disposed on the transponder substrate. Still further the present invention provides methods of production of a powerposer and an active or battery assisted RFID transponder comprising a powerposer.

31 Claims, 3 Drawing Sheets

OTHER PUBLICATIONS

International Search Report Dated Dec. 12, 2006 From the International Searching Authority Re.: Application No. PCT/IL2006/000886.

Written Opinion Dated Dec. 12, 2006 From the International Searching Authority Re.: Application No. PCT/IL2006/000886.

* cited by examiner

INTERMEDIATE ATTACHMENT MECHANISM AND USE THEREOF IN RFID TRANSPONDER

FIELD OF THE INVENTION

The present invention relates generally to active and battery-assisted RFID transponders, and specifically to an intermediate attachment mechanism and use thereof in an active or battery assisted RFID transponder.

BACKGROUND OF THE INVENTION

A typical RFID system includes an RFID transponder (tag or label), a reader and data processing equipment, such as a computer. Data transfer from/to the RFID transponder (tag or label) and the processing equipment is routed via the air interface between the reader and the RFID transponder, via the reader using for example RF TEM (Transverse Electro-Magnetic) wave, by inductive coupling and by capacitive coupling.

Battery assisted or active Radio frequency identification (RFID) transponders generally include a substrate base layer on which is disposed an integrated circuit (IC), an antenna and a power source.

One method of producing such a transponder label features applying an antenna onto a label. The IC and battery are then accurately placed on the label with the antenna. The antenna, IC and battery may be interconnected using suitable connection means.

In backscatter UHF coupling, accurate placement of the IC (chip) is essential. The chip must be accurately placed on the transponder substrate due to the miniature size of the chip connection pads. However, in known mass production methods, the need for accurate placement of the components, especially the chip, limits the speed of operation and production. A further problem with these methods is that transponders that are defectively assembled or that have defective chip and/or battery components are identified and discarded at the end product stage, which is not financially viable.

It would be desirable to have more efficient transponder assembly production, which would facilitate faster accurate mounting of the chip and faster production of more labels. It would also be advantageous to have a method of testing for malfunctioning components before the end product stage. The present invention provides such a method and mechanism for use thereof.

DETAILED DESCRIPTION OF EMBODIMENTS

Figure 1:
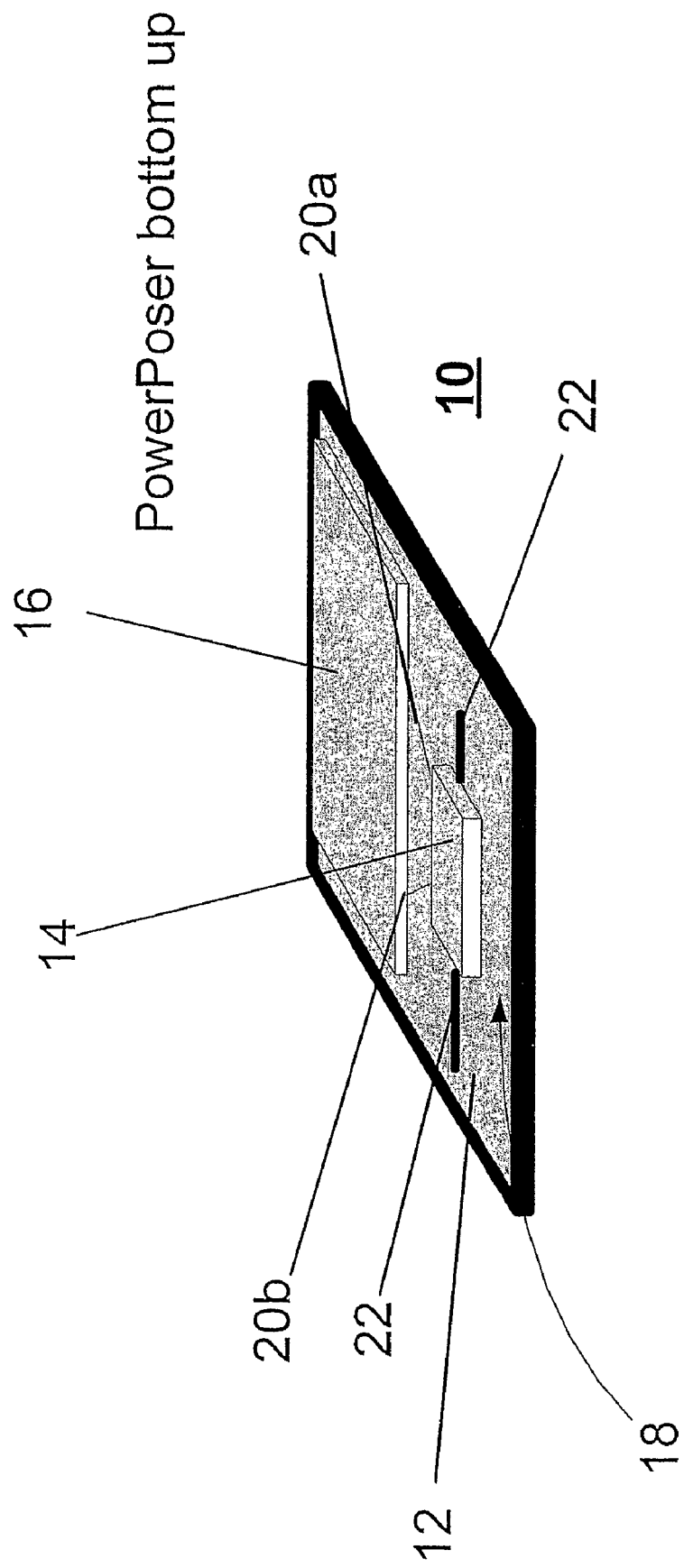
FIG. 1 is a schematic diagram of a powerposer in accordance with an embodiment of the present invention.

Embodiments of the present invention provide an intermediate attachment mechanism or device referred to herein as a "powerposer." The term "powerposer" as used herein refers to an intermediate attachment mechanism, which includes at least one power source, e.g., a battery, coupled to or integrally formed with at least one IC, which is arranged to store a code comprising information and powered with energy provided by the at least one power source and a substrate on which the at least one power source and the at least one IC are disposed. The substrate may include connection means for connecting to an application device. The substrate may also include attachment means for attaching to an application device.

Embodiments of the present invention also provide use of an intermediate attachment mechanism, or powerposer, in an active and/or battery assisted RFID transponder, in a dermal patch, or in any other suitable device.

Embodiments of the present invention also provide active and battery assisted backscatter UHF inductive coupling RFID transponders featuring a transponder substrate, at least one antenna disposed on the transponder substrate and a powerposer disposed on the transponder substrate.

Embodiments of the present invention provide a method of producing an intermediate attachment mechanism, or powerposer, including, providing a powerposer substrate base layer, placing and attaching an IC precisely on the powerposer substrate base layer, placing and attaching a power source on the powerposer substrate base layer and connecting the IC and power source.

Embodiments of the present invention also provide a method of production of an active or battery assisted RFID transponder device including the steps of providing a transponder substrate, depositing an antenna on the transponder substrate, attaching a powerposer on the transponder substrate and connecting the powerposer to the antenna.

The present invention provides a quicker and more accurate method of IC placement and assembly than known methods of the art by disposing the IC on a relatively small or miniature substrate and, as such, provides a quicker and more accurate method of producing an active or battery assisted RFID transponder than known methods of the art. The cost of the transponder assembly is reduced due to the shorter time to assemble the chip and battery. The present invention succeeds in increasing productivity, while maintaining accurate IC placement, and provides a means for checking for malfunctioning of the battery and the chip at an intermediary stage of transponder production thereby reducing associated waste and cost. Further, the present invention provides a method of testing the operation of the IC, quality of assembly and the operation of the complete powerposer assembly before the final assembly on the transponder substrate. The present invention also provides an intermediate powerposer product which can be kept in a battery disconnected state to save battery power and which may be stored and used for different applications.

Powerposer Description

FIG. 1 illustrates a powerposer device 10, in accordance with an embodiment of the present invention.

Powerposer 10 comprises a substrate 12 and at least one integrated circuit 14, at least one power source 16 and powerposer connection means 18, disposed on the substrate 12 in any suitable way.

Substrate 12 serves as the base layer for mounting the powerposer components. Substrate 12 can typically be of any suitable material. In some embodiments substrate is made from paper, polyester, polycarbonate or any suitable non-conductive thin material. In one non-limiting embodiment, the at least one IC 14 may be integrally formed with the at least one power source 16 and the substrate 12 may be configured as the substrate base layer 12 of the at least one power source 16. The other layers of the at least one power source may be applied to or printed on the power source substrate base layer. In such an embodiment, the power source substrate layer may be constructed bigger than the other at least one power source layers, to facilitate an exposed area of the substrate layer, such that the IC may be applied to the exposed power source base layer substrate region.

An integrated circuit (IC) 14, typically an application-specific IC (ASIC), is disposed on substrate 12. The IC 14 is arranged to store a code comprising information. The IC 14 is coupled to the substrate 12 by any suitable attachment means (not shown in FIG. 1) such as conductive adhesive or non-conductive adhesive or flip chip technology.

When powerposer 10 is to be used in an application such as in a battery assisted or active backscatter UHF RFID transponder, accurate placement of IC 14 on substrate 10 is preferred. In other embodiments, accuracy may not be preferable. The term "transponder" as used herein includes, but is not limited to, transponder forms such as tags, labels, stickers, wristbands, smart cards, disks or coins, glass transponders, plastic housing transponders, watch face transponders and any combination thereof. The term includes any size, thickness, shape, and form of transponder device. The term includes integrated and non-integrated devices, such as, but not limited to, devices integrated into the packaging of an object or integrated into the object or product itself. The term includes transponders, made by any suitable technology, including, but not limited to a printing technology.

For example in a battery assisted backscatter UHF transponder, IC 14 may be arranged so that the IC 14 will be as close as possible to the feed point of transponder antenna (not shown in FIG. 1), so as to maintain the desired impedance match or mismatch and to minimize signal losses. In transponder production known methods of the art, the IC 14 may be accurately placed on the larger end product transponder substrate. However, the placement machine moves relatively slowly in order to achieve the preferred accuracy, due to the very small size of the IC connection pads. Whereas, in embodiments of the present invention, it is easier to accurately place a small element, such as an IC 14, in a certain position, on a small area substrate. As such in the present invention, it is easier to achieve a higher degree of accuracy of IC 14 placement in a smaller surface area such as is provided by a powerposer substrate 12 as compared to accurate placement of the IC 14 on a larger transponder substrate in known methods. Further, due to the smaller surface area of the powerposer substrate compared to a transponder label, placement of a greater number of IC components in less time can be achieved in embodiments of the present invention.

A power source 16 is disposed on the powerposer substrate 12. The power source 16 may optionally include circuitry configured to increase or otherwise control the supplied voltage. Power source 16 can be any suitable power source, such as a battery. In some embodiments, battery 16 comprises at least one thin and flexible battery, such as the batteries produced by Power Paper Ltd. (Petah-Tikva, Israel). The placement of the power source 16 may or may not be as accurate as the placement of the IC 14, due to the larger contact area of the battery. In an example wherein the powerposer 10 is for use in a battery assisted UHF backscatter transponder, battery 16 may be positioned in order that when the powerposer is attached to the transponder there is minimum interference by the battery 16 with the radiation pattern of the transponder antenna.

Typically in an active or battery assisted transponder, power source 16 is configured to power the IC 14 and therefore IC 14 may be coupled to power source 16. Power source 16 may have at least 2 connection points 20a, 20b. In one embodiment of the present invention, only one of connection points 20a, 20b may be connected to IC 14 in powerposer 10, such that there is only partial connection. In such a way, there is no current consumption in powerposer 10 and power source 16 may be kept in an inactivated state in order to increase the longevity of the battery 16. This is advantageous, for example in a case wherein the powerposer 10 is to be used in a transponder. After attachment of the powerposer 10 to the transponder label with antenna, the second connection point 20a or 20b of power source 16 can be connected to IC 14. In one embodiment, the battery can be connected to the IC 14 via the main transponder inlay. This connection can be done close to the time of customer receipt of the end product, ensuring maximal battery current and facilitating a power saving switch.

Powerposer 10 can include connection means 22 for facilitating easy connection of powerposer components with transponder antenna. In some embodiments, powerposer 10 can include printed ink electrode stems 22 connected to the RFID silicon for facilitating easy coupling of IC 14 to the transponder.

Powerposer substrate 12 can include any suitable attachment means 18 for facilitating attachment of powerposer to end application, such as a transponder. Examples of attachment means 18 include an adhesive and any suitable mechanical means. Optionally, the connection means 22 can also be configured to function as attachment means 18.

Powerposer 10 may be configured as an intermediate attachment mechanism of a power source 16 and chip 14. Powerposer 10 can be used in a variety of devices and systems for a variety of applications, wherein the end product device or system includes a battery and a chip. In some embodiments, powerposer 10 may be for use in a device, in which accurate placement of the chip 14 is preferred. One non-limiting example is use of the powerposer in a transponder device, such as in a battery assisted or active backscatter UHF transponder device, or in a battery assisted or active inductively coupled RFID transponder, or a battery assisted or active capacitive coupled RFID transponder. Further, powerposer 10 can facilitate production of transponders with different antenna patterns and sizes. The same powerposer 10 may be used in the different transponders with the different antenna patterns.

In an alternative embodiment, powerposer can be used in a current delivery treatment device such as for electrical stimulation and/or delivery of an active substance onto/into a body area, wherein the device includes a power source and a chip. In such an embodiment, the chip may facilitate regulating, increasing, controlling and/or changing phase of the supplied electric current, voltage and time duration of the power supply.

Figure 2:
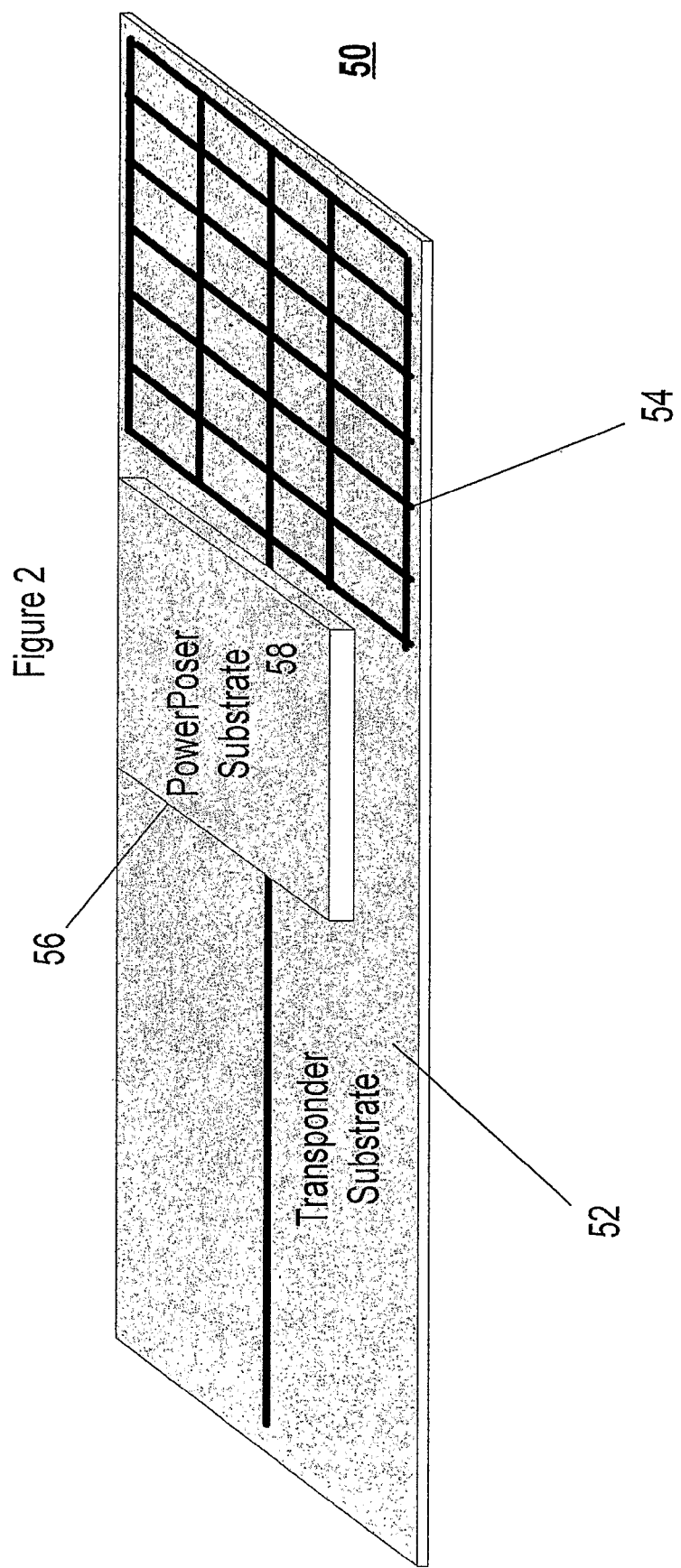
FIG. 2 is a schematic diagram of a transponder including a powerposer in accordance with an embodiment of the present invention.

FIG. 2 is a schematic diagram of a transponder including a powerposer 50. In one embodiment, transponder 50 is a battery assisted or active backscatter UHF coupled transponder. Transponder 50 comprises a transponder substrate base layer 52, on which is disposed an antenna 54 and a powerposer 56.

Powerposer 56 is disposed on substrate 52 using any suitable attachment means, such as adhesive. Powerposer 56 features a substrate 58, a power source (not seen in FIG. 2, 16 as shown in FIG. 1) and an IC (not seen in FIG. 2, 14 as shown in FIG. 1) as previously described for FIG. 1. Power source 16 is coupled to IC 14. Powerposer may include connection means to connect IC 14 (shown in FIG. 1) to antenna 54 (shown in FIG. 2).

Antenna 54 may be deposited on transponder substrate 52 using any suitable method, such as a thick-film deposition method, a printed circuit board (PCB) production method, an etching process, by printing an electrically-conductive ink, using a metallic foil, using a vaporization method, or using any other suitable method known in the art.

Transponder substrate 52 can optionally be any suitable substrate such as but not limited to paper and polyester.

Figure 3:
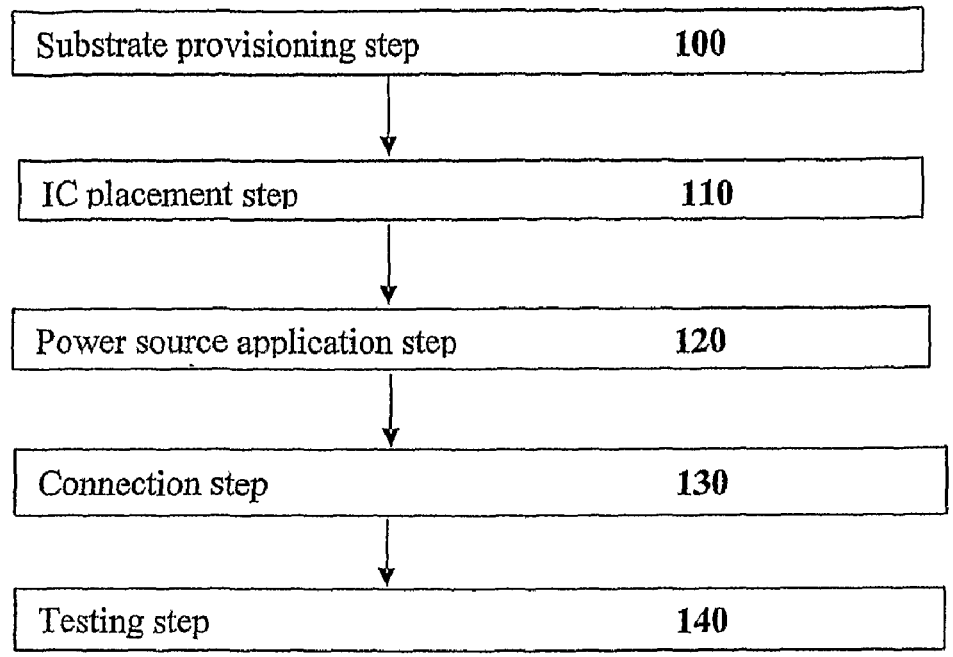
FIG. 3 is a flow chart that schematically illustrates a method for producing a powerposer, in accordance with an embodiment of the present invention.

FIG. 3 is a flow chart that schematically illustrates a method of production of a powerposer, in accordance with an embodiment of the present invention.

A powerposer substrate is provided, at a substrate provisioning step 100. The substrate base layer can typically be made of a material such as polyester or paper. Other non-limiting examples of substrate materials include woven materials, non-woven materials, polymers, conducting materials, non-conducting materials, cardboard, plastic, synthetic materials, natural materials, fabrics, metals, wood, glass, Perspex, a combination thereof or any other suitable material.

In some embodiments, powerposer substrate can be implemented to comprise a suitable attachment means, which readily facilitate attaching powerposer to the end application device such as a battery assisted or active inductive coupled transponder. The attachment means may comprise but are not limited to, adhesive, self adhesive label, magnetic attachment, suction attachment and combinations thereof.

IC may be placed on the substrate, at an IC placement step 110. The placement step as described hereinabove may preferably be accurate and therefore the placement machine may move somewhat slower in this step to facilitate the preferred placement, though the placement is still quicker than a corresponding direct placement of a chip on a larger surface area transponder label as described in the known methods of the art. Thus more IC components can be placed on more powerposer substrates than on transponder labels in the same time interval. Further, the smaller surface area of the powerposer substrate facilitates greater IC placement accuracy than the known methods of the art of direct placement on the larger transponder label.

The IC may be soldered, glued or otherwise coupled to the substrate using any other suitable means. In an embodiment wherein powerposer is to be applied to a battery assisted backscatter UHF transponder, typically, the location of the IC is chosen so that the IC will be as close as possible to the feed point of antenna, so as to maintain the desired impedance match or mismatch and to minimize signal losses.

In an alternative embodiment, IC may comprise an organic polymer electronic chip, as known in the art. Such a polymer chip is printable and can be printed directly on substrate.

The power source such as a battery is applied to the substrate, at a battery application step 120. The battery can be mechanically attached to the substrate at any suitable location and using any suitable attachment means, such as gluing, crimping or soldering. In an embodiment, wherein powerposer is to be used in an application, such as a battery assisted backscatter UHF transponder, the location of battery is chosen so as to minimize interference with the radiation pattern of antenna.

In some embodiments, when battery comprises a thin and flexible battery such as the Power Paper batteries as described in U.S. Pat. Nos. 5,652,043, 5,811,204, 5,897,522, 6,855,441 and 7,022,431, the different layers of battery can be deposited or printed on the substrate.

Battery can be interconnected with the IC at a connection step 130 by direct soldering, using PCB conductors or using any other suitable connection means. In some embodiments, battery has at least two connection points and only one connection point of the battery may be connected to the IC, in order to prevent current drain of the battery. The second connection point of the battery may be connected to the IC after the powerposer has been incorporated in an end application device.

In some embodiments, the powerposer may be tested after the IC and battery are interconnected, at a testing step 140. In some embodiments, testing of the battery and ASIC may be carried out before the inlay conversion. Testing can include checking the battery function, the IC operation and the current into the IC. One non-limiting example of testing before the second battery connection means has been connected to the IC, includes connecting a current meter in parallel with the battery and measuring the current. A powerposer, which is identified as malfunctioning may be discarded at this stage. The present invention therefore provides the advantage of detection of malfunctioning chips or batteries at this intermediary stage and preventing use thereof and subsequent production of a faulty more expensive end application product.

The order of the steps described above is not limiting and the production can be executed in any suitable different order.

In some embodiments, powerposer is particularly suitable for manufacturing using a continuous, fully-automated process.

Figure 4:
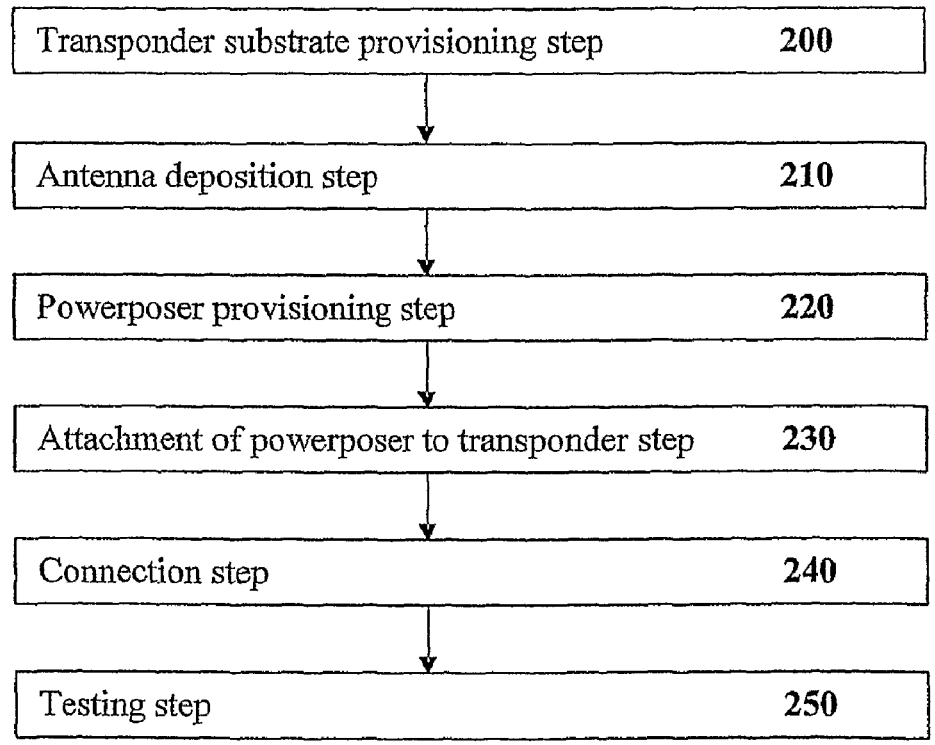
FIG. 4 is a flow chart that schematically illustrates a method for producing a transponder, in accordance with an embodiment of the present invention.

FIG. 4 is a flow chart that schematically illustrates a method for producing a RFID transponder according to an embodiment of the present invention.

A RFID transponder substrate is provided, at a transponder substrate provisioning step 200. The substrate can typically be made of a material such as polyester or paper. Other examples of substrate materials include woven materials, non-woven materials, polymers, conducting materials, non-conducting materials, cardboard, plastic, synthetic materials, natural materials, fabrics, metals, wood, glass, Perspex, a combination thereof or any other suitable material.

The antenna is deposited onto the substrate, at an antenna deposition step 210. The antenna may be deposited using a thick-film deposition method, an etching process, by attaching a metallic foil or template cut to the appropriate shape, by printing a suitable electrically-conductive ink, using a vaporization method, or using any other suitable deposition method. In some embodiments, antenna is deposited on the substrate using a suitable printed circuit board (PCB) manufacturing process.

The powerposer, which may have been assembled as described hereinabove in FIG. 3, is provided at a powerposer provisioning step 220.

The powerposer is attached to the transponder substrate at an attachment step 230. Attachment of powerposer is relatively quick as accurate placement may not be as preferable due to the relatively large surface area of the powerposer compared to the IC. Attachment can be facilitated by any suitable means such as for example by an adhesive layer on the powerposer substrate.

The powerposer components are connected to the transponder substrate components, which in some embodiments may be the antenna, in a connection step 240, to facilitate connection of IC to the antenna. In some embodiments, the powerposer external connections to the antenna may be facilitated via printed conductor to printed conductor connections. The accuracy of the connection between the powerposer and the printed antenna may not be critical and may therefore be simple, fast and inexpensive. In some embodiments, a conductive adhesive may be used to facilitate connection.

Optionally, in an embodiment wherein only one of the power source connection points has been connected to the IC, the second power source connection point may be connected to the IC.

In some embodiments the transponder including powerposer is tested at a testing step 250.

The order of the steps described above is not limiting and can be executed in different orders.

A powerposer may be produced and provided to a transponder in the production of a transponder, such as for production of a UHF battery assisted transponder, in various formats according to the production method or equipment used. Non-limiting examples of suitable formats include: single powerposers cut and stored in a dispensing device, such as a cassette for dispensing of single powerposers, in a narrow web featuring a roll of a strip of powerposers or in a wide web featuring multiple rolls of strips of powerposers.

The transponder production equipment may employ various techniques to assemble the powerposers on the transponder/s. Non-limiting examples include: direct dispensing of one powerposer at a time in a "Start-Stop-Dispense" cycle; direct dispensing of Multiple powerposers from a wide web of powerposers onto a wide web of multiple transponders; "Pick-and-Place" of powerposers from a single or multiple strip of powerposers; a continuous technique using continuous lamination of a powerposer web onto a transponder web using for example a "Roll-To-Roll" technology; and a non-continuous method using for example a "Start-Stop-Adhere" cycle of assembling a powerposer web onto a transponder web using for example a "Roll-To-Roll" technology.

In an embodiment wherein the RFID transponder antennas are printed directly onto the packaging of the product to be tracked, a suitable method to be used may include, but is not limited to a direct dispensing technique, a pick-and-place technique and a continuous method of applying the powerposer.

The transponder production method of the present invention as described hereinabove may involve an extra step of attachment of the powerposer to the transponder label, when compared to a transponder production method of the art. However, the IC placement step of the present invention is quicker than the methods of the art facilitating an overall process, which is faster and more accurate than the production methods of inductive transponders as described in the art. Further, attachment of the powerposer to a transponder substrate is a relatively non-accurate and inexpensive process facilitating a less costly transponder production and assembly method than the methods of the art. In addition, the present invention offers the advantage of a standard powerposer, which may be applied to various antenna sizes and patterns. The present invention facilitates full testing of the battery and IC before inlay conversion. A further advantageous feature of the present invention is that the powerposer can include a power saving switch before the inlay conversion.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A powerposer for use in an active or battery assisted RFID transponder, comprising:
at least one power source coupled to an integrated circuit;
at least one integrated circuit arranged to store a code comprising information and powered by the at least one power source; and
a substrate on which the at least one power source and the at least one integrated circuit are disposed, wherein the substrate comprises:
connection means for connecting to said active or battery assisted RFID transponder; and
attachment means for readily attaching to said active or battery assisted RFID transponder.

2. The powerposer of claim 1, wherein the at least one power source is a thin and flexible battery.

3. The powerposer of claim 1, wherein the connection means comprises connection means configured to connect to an antenna.

4. The powerposer of claim 1, wherein the connection means comprises at least two connection points.

5. The powerposer of claim 1, wherein the connection means and the attachment means are the same.

6. The powerposer of claim 1, wherein the attachment means comprises adhesive.

7. The powerposer of claim 1, wherein the application device is a transponder.

8. The powerposer of claim 1, wherein the at least one power source is one of connected to the at least one integrated circuit, partially connected to the at least one integrated circuit or disconnected from the at least one integrated circuit.

9. The powerposer of claim 8, wherein the at least one power source is partially connected to the integrated circuit or disconnected from the integrated circuit prior to attachment of the powerposer to an application device to facilitate preventing power source current drain prior to use of the application device.

10. The powerposer of claim 9, wherein the application device is a transponder.

11. The powerposer of claim 1 as an intermediate attachment mechanism.

12. The powerposer of claim 1, wherein the substrate is a base layer substrate of the at least one power source.

13. The powerposer of claim 12, wherein the at least one integrated chip is integrally formed with the at least one power source.

14. An active or battery assisted RFID transponder comprising:
(a) a transponder substrate;
(b) at least one antenna disposed on the transponder substrate; and
(c) a powerposer disposed on the transponder substrate, the powerposer comprising:
a. at least one power source coupled to an integrated circuit;
b. at least one integrated circuit arranged to store a code comprising information, wherein the at least one integrated circuit is powered by the at least one power source; and
c. a powerposer substrate on which the at least one power source and the at least one integrated circuit are disposed, wherein the substrate comprises attachment means for readily attaching to the transponder substrate and connection means for connecting to an application device.

15. The RFID transponder of claim 14, wherein the transponder is selected from the group consisting of a backscatter UHF transponder, an inductively coupled transponder and a capacitive coupled transponder.

16. The RFID transponder of claim 14, wherein the at least one power source is a thin and flexible battery.

17. The RFID transponder of claim 14, wherein the powerposer connection means is configured for facilitating connection to an antenna.

18. The RFID transponder of claim 14, wherein the powerposer attachment means comprises adhesive.

19. The RFID transponder of claim 14, wherein the at least one integrated circuit is disposed on the powerposer substrate in close proximity to a feed point of the at least one antenna.

20. The RFID transponder of claim 14, wherein the at least one power source is disposed on the powerposer substrate at a position to facilitate minimum interference by the at least one power source with a radiation pattern of the at least one antenna.

21. A method of producing a powerposer comprising:
   providing a powerposer substrate base layer;
   placing and attaching an integrated circuit on the powerposer substrate base layer;
   placing and attaching a power source on the powerposer substrate base layer; and connecting the integrated circuit to the power source.

22. The method of claim 21, wherein the powerposer is for use in a transponder and wherein the integrated circuit is placed on the powerposer substrate in close proximity to a feed point of a transponder antenna.

23. The method of claim 21, wherein the powerposer is for use in a transponder and wherein the power source is placed on the substrate in a position to facilitate minimum interference by the power source with a radiation pattern of a transponder antenna.

24. The method of claim 21, wherein the power source is one of connected to the integrated circuit, partially connected to the integrated circuit or disconnected from the integrated circuit.

25. The method of claim 21, wherein the power source is partially connected to the integrated circuit or disconnected to the integrated circuit prior to attachment of the powerposer to an application device to facilitate preventing power source current drain prior to use of the application device.

26. The method of claim 25, wherein the power source is connected to the integrated circuit to facilitate powering of the integrated circuit after attachment of the powerposer to the application device.

27. The method of claim 25, further comprising testing the powerposer.

28. The method of claim 25 for powerposer mass production.

29. The method of claim 25, further comprising adding a power source control element.

30. A method of production of an active or battery assisted transponder device comprising the steps of:
   providing a transponder substrate;
   depositing an antenna on the transponder substrate;
   attaching a powerposer on the transponder substrate, wherein the powerposer comprises:
   at least one power source coupled to an integrated circuit;
   at least one integrated circuit, which is arranged to store a code comprising information and powered by the at least one power source; and
   a powerposer substrate on which the at least one power source and the at least one integrated circuit are disposed, wherein the powerposer substrate comprises attachment means for readily attaching to the transponder substrate; and
   connecting the powerposer to the antenna.

31. Use of a powerposer for production of a battery assisted or active RFID transponder, wherein the powerposer facilitates a power saving means, the powerposer comprising:
   at least one power source coupled to an integrated circuit;
   at least one integrated circuit, which is arranged to store a code comprising information and powered by the at least one power source; and
   a substrate on which the at least one power source and the at least one integrated circuit are disposed, wherein the substrate comprises connection means for connecting to an application device and attachment means for readily attaching to the application device; and wherein the at least one power source is partially connected to the at least one integrated circuit or disconnected from the at least one integrated circuit, prior to attachment of the powerposer to the transponder.

* * * * *